E. E. HOWARD.
LAWN SPRINKLER.
APPLICATION FILED MAR. 26, 1915.

1,163,152.

Patented Dec. 7, 1915.
2 SHEETS—SHEET 1.

WITNESSES:
Wm. S. Schmitt
D. E. Crabb.

INVENTOR
E. E. Howard.
BY
Geisler
ATTORNEY

UNITED STATES PATENT OFFICE.

ERNEST EUGENE HOWARD, OF PORTLAND, OREGON.

LAWN-SPRINKLER.

1,163,152.  Specification of Letters Patent.  Patented Dec. 7, 1915.

Application filed March 26, 1915. Serial No. 17,279.

*To all whom it may concern:*

Be it known that I, ERNEST EUGENE HOWARD, a citizen of the United States, and a resident of Portland, county of Multnomah, and State of Oregon, have invented a new and useful Improvement in Lawn-Sprinklers, of which the following is a specification.

My invention relates to lawn sprinkling devices and particularly to that class thereof which are automatic in action, and are adapted to sprinkle an extended area without attention.

One of the main objects of my invention is to provide a sprinkling apparatus of this character which is of simple construction, and operated to automatically sprinkle a sectional area of the lawn, the device being operated by the pressure of the stream of water emitted from the nozzle.

Another of the main objects of my invention is to make the device adjustable so as to vary the sectoral area over which the water is sprinkled.

The features of my invention and its details are hereinafter fully set forth and illustrated in the accompanying drawings, in which—

Figure 1:
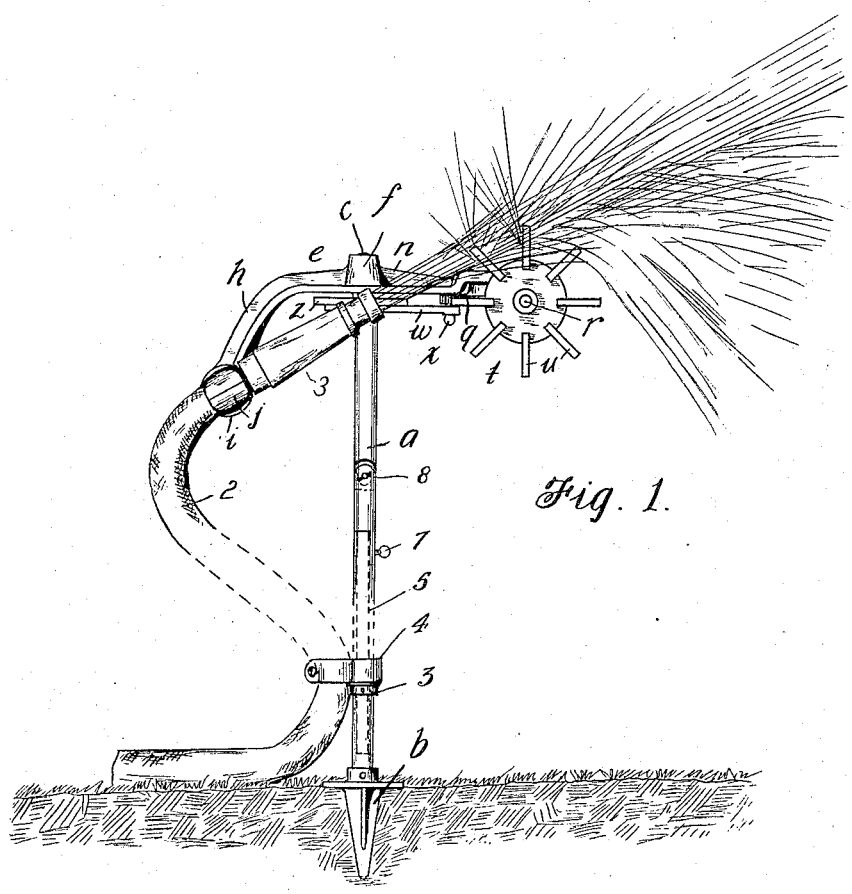
Figure 2:
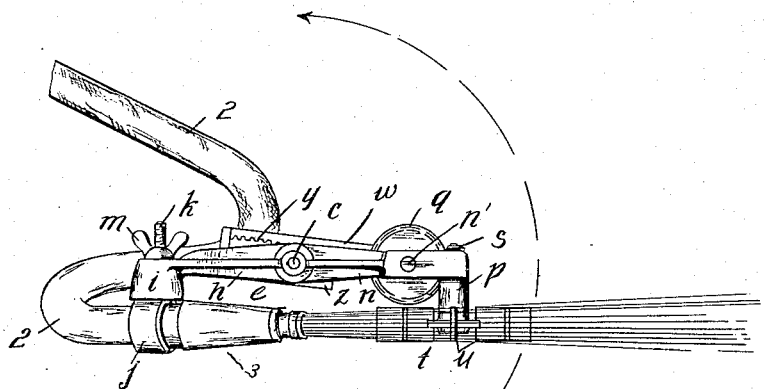
Figure 3:
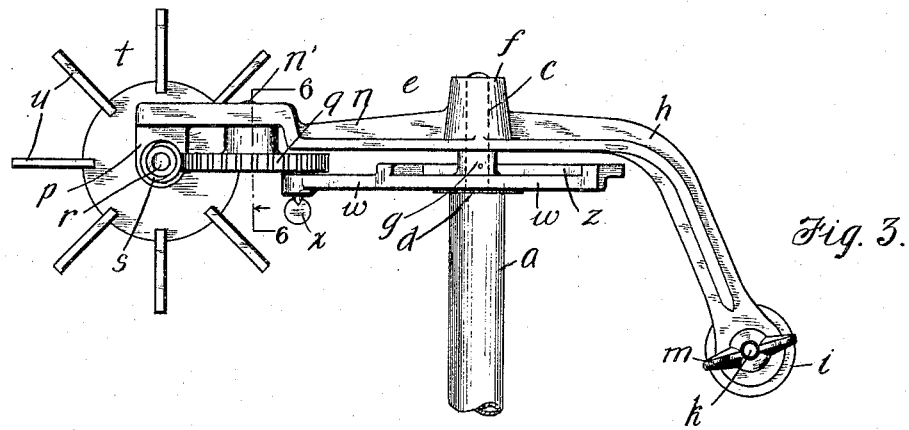
Figure 4:
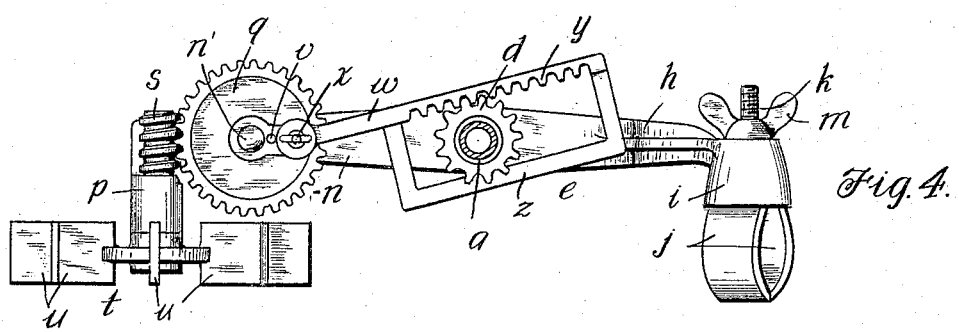
Figures 5, 6:
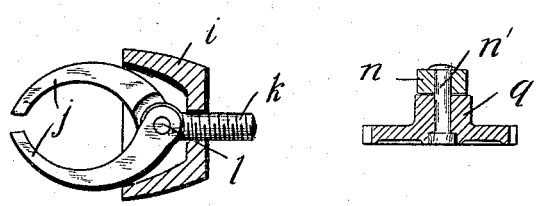

Figure 1 is a side elevation of my device, showing it in actual use; Fig. 2 is a top view of the parts shown in Fig. 1, the circular line showing the sectoral area through which my apparatus acts; Fig. 3 is a larger-scale side elevation of my device, viewed from the side opposite to that shown in Fig. 1; Fig. 4 is a bottom plan view of the parts shown in Fig. 3; this view details the mechanical movement which operates my device. Fig. 5 shows the adjustable clamp by means of which the hose is held in position, and Fig. 6 is a cross-section taken on the plane of the line 6—6 of Fig. 3.

$a$ represents a rod, which may be made of a piece of pipe. The bottom of the rod is provided with a pointed end $b$, adapted to be thrust into the ground, so as to hold said rod at any angle desired. In the upper end of said rod is provided a journal end $c$, (see Fig. 3) and a spur-gear $d$ is nonrotatably fixed on said journal end. The double ended arm $e$ is provided with a hub $f$, rotatably mounted on the journal end $c$. The lower face of the arm $e$ rests on the upper end of the hub $g$, of the gear $d$. The end $h$, of the arm $e$, is curved downwardly and is provided with a cup-shape sleeve $i$, in which the hose clamp $j$ is mounted. The hose clamp $j$ is pivoted to the screw $k$ by a pin $l$, (see Fig. 5), said screw projecting through a hole in the sleeve $i$ and being held in place by a wing nut $m$. It is to be noted that the clamp $j$ may be rotated relative to the axis of the sleeve $i$, so that the nose held by said clamp may be given any pitch desired. By tightening the nut $m$, the pivoted jaws of the clamp $j$, will be drawn within the cup-shape sleeve $i$, and will thus be forced together as indicated in Fig. 5.

The end $n$ of the arm $e$ supports the motion-transmitting devices. These consist of a worm-gear $q$ pivotally mounted on a downwardly projecting shouldered stud $n$, provided on the end $n$ of the arm $e$. The extremity of the end $n$ of the arm $e$ is made with a laterally projecting journal bearing $p$, in which a journal pin or shaft $r$ is journaled. A worm $s$, meshing with and adapted to drive the worm-gear $q$, is fixed on one end of said pin $r$, and on the other end of the latter is fixed a water-wheel $t$, the blades of which are indicated by $u$. It is evident therefore, that the rotation of the turbine wheel will drive the worm gear $q$.

The lower face of the worm-gear $q$ is provided with a plurality of tap-holes $v$, (see Fig. 4) located in radial alinement with the center of the gear. A crank-arm $w$ is pivotally connected to said worm-gear by a screw $x$, which is adapted to be threaded into one of the holes $v$. The crank-arm $w$ is provided with rack-teeth $y$, meshing with the gear $d$, and is further made with a supporting member $z$, parallel to the rack-teeth. The arm $z$ encompasses the hub of the gear $d$, and rides on the upper face of the gear $d$ and in so doing supports the crank-arm $w$.

2 represents a garden hose having a nozzle 3.

In practice the nozzle end of the hose 2 is brought up as close to the rod $a$ as possible, (see Fig. 1) and is supported by the clamp $j$, which is so adjusted as to cause the stream of water to partially impinge on the blades of and rotate the turbine wheel $t$. The consequent rotation of the worm $s$ will rotate the worm-gear $q$, and therewith the crank arm $w$, and because of the rack-teeth $y$ working on the fixed gear $d$, the arm $e$ will be given an oscillating backward and forward movement about its vertical pivot, thereby sprinkling the water uniformly over a sectoral area as indicated by the circular broken line of Fig. 2. By changing the point of connection of the arm closer to the center of the worm gear $q$, the oscillatory throw of the stream may be reduced, thereby confining the sprinkling to a smaller sectoral area.

Since my device does not make a complete revolution about its vertical axis, it may be used in many places where a completely revolving sprinkling apparatus would be impractical. Furthermore, the apparatus may be moved about from one place to another without being required to turn off the water supply in order to reach the apparatus as is necessary in prior devices.

In order to adapt my device to use under different conditions, I prefer to make the rod $a$ of two parts, the upper part having a member 5 telescoping in the lower part, as shown in Fig. 1, and the upper part further having a joint 8, so that the rod can be adjusted to any convenient length and that the upper part may be adjusted at any convenient angle. Such adjustment facilitates the confining of the sprinkling to a prescribed area of the lawn. Furthermore, in order to avoid imposing too much weight on the arm $e$, I prefer to provide on the rod $a$, a supplemental hose clamp 4, rotatably supported on a collar or flange 3. These details are all shown in Fig. 1.

I claim:

1. In a device of the character described, the combination of a supporting member, an arm pivoted on such supporting member, a hose-holding means on one end of the arm, a water-wheel rotatably journaled on the other end of the arm, and adjustable means operated by the water-wheel for imparting to the arm a variable oscillatory movement.

2. In a device of the character described, the combination of a longitudinally variable supporting member, an arm centrally pivoted on such supporting member, an adjustable hose-clamp on one end of the arm, a water-wheel rotatably journaled on the other end of the arm, and adjustable means operated by the water-wheel for imparting to the arm a variable oscillatory movement.

3. In a device of the character described, the combination of a longitudinally variable supporting member, also adapted for angular variation, an arm centrally pivoted on such supporting member, an adjustable hose-clamp on one end of the arm, a water-wheel rotatably journaled on the other end of the arm, and adjustable means operated by the water-wheel for imparting to the arm a variable oscillatory movement.

4. In a device of the character described, the combination of a supporting member, an arm centrally pivoted on such supporting member, an adjustable hose-clamp on one end of the arm, a water-wheel rotatably journaled on the other end of the arm, adjustable means operated by the water wheel for imparting to the arm a variable oscillatory movement, and an auxiliary hose clamp on the supporting member.

5. In a device of the character described, the combination of a longitudinally variable supporting member, also adapted for angular variation, an arm centrally pivoted on such supporting member, an adjustable hose-clamp on one end of the arm, a water-wheel rotatably journaled on the other end of the arm, adjustable means operated by the water-wheel for imparting to the arm a variable oscillatory movement, and an auxiliary hose clamp on the supporting member.

6. In a device of the character described, the combination of a supporting member, a non-rotatable gear on the supporting member; an arm pivoted at the center on the supporting member; a hose-clamp on one end of such arm; a laterally projecting journal-box on the opposite end of the arm; a shaft journaled in such journal-box; a water-wheel on one end of the shaft, and a worm on the opposite end of the shaft; a worm-gear journaled on such arm and meshing with said worm; a rack-faced crank-arm adjustably connected to said worm-gear, and meshing with said non-rotatable gear; and means for supporting the rack-faced crank-arm in meshing relation with said non-rotatable gear.

7. In a device of the character described, the combination of a supporting member, adapted for longitudinal and angular variation, a non-rotatable gear on the supporting member; an arm pivoted at the center on the supporting member; a hose-clamp on one end of such arm; a laterally projecting journal-box on the opposite end of the arm; a shaft journaled in such journal-box; a water-wheel on one end of the shaft, and a worm on the opposite end of the shaft; a worm-gear journaled on said arm and meshing with said worm, a rack-faced crank-arm adjustably connected to said worm-gear, and meshing with said non-rotatable gear; and means for supporting the rack-faced crank-arm in meshing relation with said non-rotatable gear.

8. In a device of the character described, the combination of a supporting member, a non-rotatable gear on the supporting member; an arm pivoted at the center on the supporting member; a hose-clamp on one end of such arm; a laterally projecting journal-box on the opposite end of the arm; a shaft journaled in such journal-box; a water-wheel on one end of the shaft; a worm on the opposite end of the shaft; a worm-gear journaled on such arm and meshing with said worm; a rack-faced crank-arm adjustably connected to said worm gear, and meshing with said non-rotatable gear; means for supporting the rack-faced crank-arm in meshing relation with said non-rotatable gear, and an auxiliary hose-clamp on the supporting member.

9. In a device of the character described, the combination of a supporting member, adapted for longitudinal and angular variation, a non-rotatable gear on the supporting member; an arm pivoted at the center on the supporting member; a hose-clamp on one end of such arm; a laterally projecting journal-box on the opposite end of the arm; a shaft journaled in such journal-box; a water-wheel on one end of the shaft; and a worm on the opposite end of the shaft; a worm-gear journaled on said arm and meshing with said worm, a rack-faced crank-arm adjustably connected to said worm-gear, and meshing with said non-rotatable gear; means for supporting the rack-faced crank arm in meshing relation with said non-rotatable gear, and an auxiliary hose-clamp on the supporting member.

ERNEST EUGENE HOWARD.

Witnesses:
WM. C. SCHMITT,
D. E. CRABB.

Copies of this patent may be obtained for five cents each, by addressing the "Commissioner of Patents, Washington, D. C."